United States Patent Office

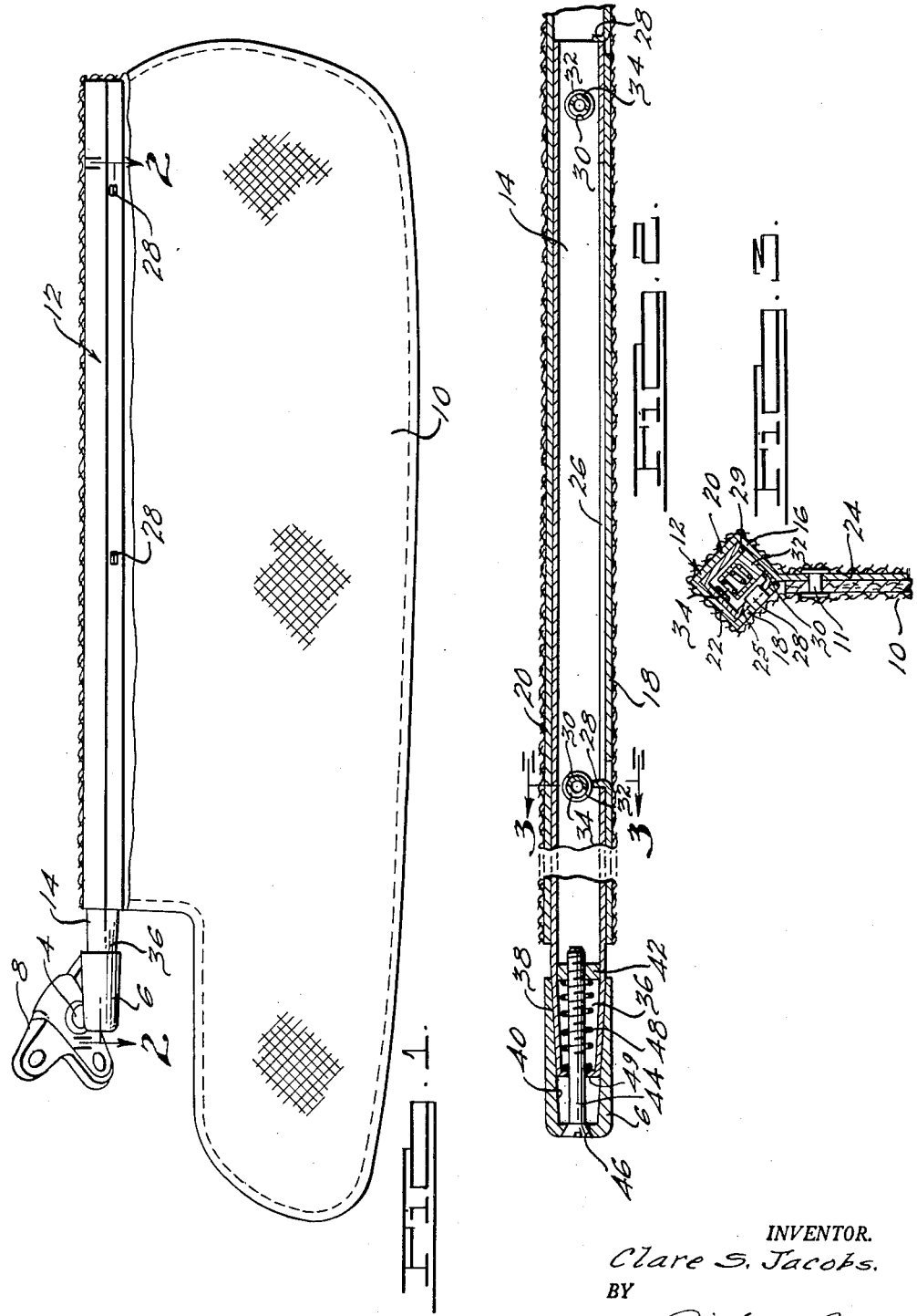

3,059,961
Patented Oct. 23, 1962

3,059,961
VEHICLE SUN VISOR
Clare S. Jacobs, Detroit, Mich., assignor to Jacob's Industries, Inc., Detroit, Mich., a corporation of Michigan
Filed Nov. 4, 1960, Ser. No. 67,186
5 Claims. (Cl. 296—97)

This invention relates to vehicle visors and glare shields and and more particularly to vehicle visors which pivot around an axis, as well as slide longitudinally along the axis.

Present day vehicle visors are normally supported by solid metal arms having various types of adjustment means and stop means for locating the visor in various positions. These structures are expensive to produce and they have an excessive number of elements which when worn result in looseness, thereby causing rattles and poor adjustment.

The present invention contemplates an economical sheet metal structure comprising a minimum number of elements which are arranged in a manner to compensate for wear, thereby eliminating the rattles and poor adjustment normally present in visor support structures after a long period of use.

Therefore, an object of this invention is to support automobile visors for quick adjustment on a lightweight, economical sheet metal structure which will not rattle.

A further object of this invention is to provide an improved visor support structure having a small number of elements and being substantially a sheet-metal construction which will permit the visor to pivot about an axis as well as slide longitudinally along the axis.

A still further object of this invention is to compensate for wear between the relatively moving portions of visor support structure to insure accurate adjustment even after long periods of use.

Further objects, features and advantages of this invention will become apparent from a consideration of the following description, the appended claims and the accompanying drawing in which:

FIGURE 1 is a front elevation of the present invention with part of the visor being broken away from its support.

FIGURE 2 is a cross-sectional view taken along the line 2—2 of FIGURE 1; and

FIGURE 3 is a cross-sectional view taken along the line 3—3 of FIGURE 2.

In the illustrated embodiment of the invention, an arm element 4 extends from a socket member 6 and is pivotably received by a bracket which is generally designated 8 and is adapted to be mounted on a windshield header panel. A visor 10 is connected by suitable fastening means such as rivets 11 to a tubular visor support generally designated 12 which is slidingly received by a tubular support arm 14 which extends into socket member 6.

As can be seen in FIGURE 3, the tubular visor support 12 is a continuous single piece of sheet-metal material having lower sides 16 and 18, and upper sides 20 and 22. Lower side 16 terminates in a support edge 24 on which visor 10 is fastened by suitable means such as rivets 11. The tubular support arm 14 slidingly receives support 12 and has a plurality of sides equal in number to the sides of the support 12 which engage the sides of visor support 12 to prevent rotation of visor 10 about support arm 14. One side 25 of support arm 14 has an elongated aperture 26 therein which receives turned-in portions or stops 28 which are formed integrally with the lower side 18 of visor support 12 to limit the sliding movement between arm 14 and support 12. Another one of the sides 29 of support arm 14 has a plurality of slots 30 therein which slidingly receive tubular elements 32 each of which is biased by a spring 34 outwardly of the tubular arm 14 against visor support arm 12. The biasing action of spring 34 on tubular element 32 causes the sides of support arm 14 to bear snugly against the inner surface of the sides of visor support 12 to prevent looseness and consequent rattling between arm 14 and support 12.

A frusto-conical outer end portion 36 of tubular support arm 14 extends outwardly from visor support 12 at all times and has a conical outer surface 38 which extends into socket element 6 which has a conical inner surface 40 that overlies the surface 38.

A threaded bolt 44 extends through a counterbore 46 in the end of socket 6 and receives a nut 42 which is mounted within the outer end portion 36 to loosely interconnect the socket 6 and end portion 36. A spring 48 is disposed between a flange 49, or other suitable holding means on the end portion 36, and the nut 42 for biasing the outer conical surface 38 of end portion 36 into frictional engagement with surface 40. Adjustment of bolt 44 will cause a greater or lesser spring force on flange 49 to control the frictional force between surfaces 38 and 40. Such contact prevents gravitational forces from pivoting visor 10 about the longitudinal axis of arm 14 but will nevertheless permit manual adjustment of visor 10. As the surfaces wear, the outer end portion 36 will move toward the fixed socket member 6 under the biasing action of the spring 40 acting on the flange 49. Therefore, the surfaces 38 and 40 will continue to be in a frictional engagement which resists gravitational forces but permits easy manual adjustment of visor 10.

From the foregoing, it is apparent that a visor support structure has been provided of light-weight, economical construction which will continue to function over a long period of use.

It will be understood that the specific construction of the improved automobile visor and glare shield which is herein disclosed and described is presented for purposes of explanation and illustration and is not intended to indicate limits of the invention, the scope of which is defined by the following claims.

What is claimed is:

1. In a visor structure, a tubular support having a plurality of sides, a sheet-metal arm having a plurality of sides slidingly engaging said tubular support, one of said sides of said arm having a recess therein, stop means on said tubular support extending into said recess for limiting the longitudinal movement of said arm, another of said sides of said arm having a slot therein, a spring mounted in said slot having a tubular member fitted thereon pressed by said spring against said tubular support for biasing said arm against said tubular support, said arm further having a frusto-conical end portion extending outwardly of said tubular support, sleeve means adapted to be mounted on a windshield header panel having an inner surface overlying said frusto-conical end portion, and means including a spring mounted within said arm for holding the outer surface of said frusto-conical end portion in frictional engagement with the inner surface of said sleeve means.

2. In a visor structure, a tubular support having a plurality of sides, a sheet-metal arm having a plurality of sides slidingly engaging said tubular support, one of said sides of said arm having an aperture therein, stop means on said tubular support extending into said aperture for limiting the longitudinal movement of said arm, another one of said sides of said arm having a plurality of slots therein, a plurality of tubular elements slidingly engaging said slots, and springs biasing said tubular elements against said tubular support for holding said sheet-metal arm tightly in said tubular support, said sheet-metal arm having a frusto-conical end portion extending outwardly from said tubular support, a socket having a conical inner surface overlying said frusto-conical end portion, spring support means mounted inside of said frusto-conical end portion, adjustable connection means mounted on said socket extending into said support means for holding said frusto-conical end portion from moving longitudinally away from said socket, a spring mounted around said connection means biased between said frusto-conical end portion and said spring support means for moving said frusto-conical end portion into frictional engagement with said socket means.

3. In a visor structure, a tubular visor support having a plurality of sides, a tubular arm having a plurality of sides slidingly extending into said tubular visor support, one of said sides having a plurality of slots therein, tubular elements extending into said slots, spring means inside of said tubular arm biasing said tubular elements outwardly from said arm against said visor support for holding said tubular arm against the sides of said tubular visor support, said tubular arm having a tubular frusto-conical end portion extending outwardly from said visor support, a socket element extending over said frusto-conical end portion, a spring support element mounted inside said frusto-conical end portion, means for connecting said support element to said socket, and a spring mounted inside said tubular frusto-conical end portion bearing against said spring support element and against said frusto-conical end portion for moving said outer surface of said frusto-conical end portion into frictional engagement with said socket.

4. In a visor structure, a visor support having a plurality of sides, a sheet-metal arm having a plurality of sides slidingly engaging said visor support, one of said sides of said arm having an aperture therein, stop means on said visor support extending into said aperture for limiting the longitudinal movement of said arm in said visor support, another of said sides having a plurality of slots therein, tubular elements slidingly engaging said slots, and spring means for biasing said tubular elements outwardly of said arm into engagement with said visor support, said arm having a tubular frusto-conical end portion extending outwardly of said visor support, a spring support element mounted inside said frusto-conical end portion, a socket extending over the outer surface of said frusto-conical end portion, connection means between said socket and said spring support element, and a spring disposed inside of said frusto-conical end portion bearing against said spring support element and said end portion for causing the outer surface of said frusto-conical end portion to frictionally engage the inner wall of said socket.

5. In a visor structure, a tubular support having a plurality of sides, an arm having a plurality of sides slidingly engaging said tubular support, one of said sides of said arm having a slot therein, a spring mounted in said slot having a tubular member fitted thereon pressed by said spring against said tubular support for biasing said arm against said tubular support, said arm further having a frusto-conical end portion extending outwardly of said tubular support, sleeve means adapted to be mounted on a windshield header panel having an inner surface overlying said frusto-conical end portion, means interconnecting said sleeve means and said frusto-conical end portion for preventing excessive longitudinal movement therebetween, and means including a spring mounted within said frusto-conical end portion for biasing the outer surface of said frusto-conical end portion into frictional engagement with said inner surface of said sleeve means.

References Cited in the file of this patent

UNITED STATES PATENTS

| | | |
|---|---|---|
| 1,447,519 | Schade | Mar. 6, 1923 |
| 2,110,120 | Ball | Mar. 8, 1938 |
| 2,201,348 | Roberts | May 21, 1940 |
| 2,360,183 | Westrope | Oct. 10, 1944 |
| 2,606,050 | Morris et al. | Aug. 5, 1952 |